US012689823B2

(12) United States Patent
Canini et al.

(10) Patent No.: US 12,689,823 B2
(45) Date of Patent: Jul. 21, 2026

(54) IMAGE SENSOR WITH CHAIN-CAPABILITY FOR MULTI-CAMERA APPLICATION

(71) Applicant: Datalogic IP Tech S.r.l., Calderara Di Reno (IT)

(72) Inventors: Federico Canini, Bologna (IT); Davide Bruni, Bologna (IT); Simone Spolzino, Granarolo dell'Emilia (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 95 days.

(21) Appl. No.: 18/468,645

(22) Filed: Sep. 15, 2023

(65) Prior Publication Data

US 2025/0097572 A1    Mar. 20, 2025

(51) Int. Cl.
*H04N 23/661*      (2023.01)
*G06K 7/14*        (2006.01)
*H04N 23/45*       (2023.01)

(52) U.S. Cl.
CPC ......... *H04N 23/662* (2023.01); *G06K 7/1413* (2013.01); *H04N 23/45* (2023.01)

(58) Field of Classification Search
CPC .... H04N 23/662; H04N 23/45; H04N 13/296; H04N 13/239; G06K 7/1413
See application file for complete search history.

(56) References Cited

U.S. PATENT DOCUMENTS

| | | | |
|---|---|---|---|
| 7,014,113 B1 * | 3/2006 | Powell | G06K 7/10683 |
| | | | 235/462.25 |
| 7,221,395 B2 | 5/2007 | Kinjo | |
| 9,286,499 B1 | 3/2016 | Canini et al. | |
| 9,423,886 B1 * | 8/2016 | Neglur | G06F 3/017 |
| 10,826,987 B2 | 11/2020 | D'Ercoli et al. | |
| 10,970,502 B2 | 4/2021 | Canini et al. | |
| 2011/0157418 A1 * | 6/2011 | Raynor | H04N 1/193 |
| | | | 348/E5.037 |
| 2011/0267433 A1 | 11/2011 | Thorpe et al. | |
| 2012/0189293 A1 * | 7/2012 | Cao | H04N 23/45 |
| | | | 396/333 |

(Continued)

OTHER PUBLICATIONS

Wikipedia contributors. (Aug. 31, 2020). Data structure alignment. In Wikipedia, The Free Encyclopedia. Retrieved 18:39, Aug. 29, 2025, from https://en.wikipedia.org/w/index.php?title=Data_structure_alignment&oldid=975890503 (Year: 2020).*

(Continued)

*Primary Examiner* — Timothy J Henn
(74) *Attorney, Agent, or Firm* — Foley & Lardner LLP

(57) ABSTRACT

A multi-camera system and method may include a first camera including a first lens and a first image sensor, and a second camera including a second lens in a second image sensor. The first image sensor may be communicatively coupled with the second image sensor, where the first image sensor is configured to communicate image data to the second image sensor. A camera controller may be configured to cause the first and second image sensors to capture and generate respective first and second image data. The first image data may be communicated from the first image sensor to the second image sensor, and the second image sensor may be configured to output a data stream inclusive of the first image data and the second image data.

19 Claims, 6 Drawing Sheets

(56)     References Cited

U.S. PATENT DOCUMENTS

| 2014/0192213 | A1* | 7/2014 | Han | H04N 21/00 |
| | | | | 348/218.1 |
| 2014/0267588 | A1* | 9/2014 | Arcas | H04N 23/698 |
| | | | | 348/36 |
| 2014/0285681 | A1* | 9/2014 | Kanou | H04N 5/77 |
| | | | | 348/218.1 |
| 2014/0368609 | A1* | 12/2014 | Chang | H04N 23/698 |
| | | | | 348/38 |
| 2017/0289646 | A1* | 10/2017 | Kanthapanit | H04N 5/0675 |
| 2017/0295352 | A1* | 10/2017 | Ihlenburg | H04N 7/181 |
| 2019/0228565 | A1* | 7/2019 | Yushiya | H04N 21/21805 |
| 2021/0103121 | A1* | 4/2021 | Good | G06K 7/10881 |
| 2021/0327946 | A1* | 10/2021 | Guo | H10F 39/1895 |
| 2023/0206205 | A1 | 6/2023 | Howard et al. | |
| 2023/0296441 | A1* | 9/2023 | Van Laere | G01J 5/025 |
| 2023/0297525 | A1* | 9/2023 | Klein | G06F 13/4291 |

OTHER PUBLICATIONS

Extended European Search Report for EP 24200039.6 dated Feb. 6, 2025, 12 pgs.

* cited by examiner

IMAGE SENSOR WITH CHAIN-CAPABILITY FOR MULTI-CAMERA APPLICATION

BACKGROUND

Multi-camera systems are often used to give the capability of a vision system to extract features on a video stream that represent an extended depth-of-field or enlarged field-of-view. Another example of the usage of multi-camera systems is stereo vision, where two cameras are synchronized to create a stereo image that may be used to calculate the depth map for distance calculations and 3D reconstruction of objects in a scene. In the field of barcode reading, an application of a multi-camera may be used to extend a depth-of-field of a code reader. Various scan engines may be configured with multiple cameras so as to extend depth-of-field when reading codes, but many other applications and functions may be provided through use of multi-camera configurations.

Multi-camera systems can be expensive due to having to use a controller or processor (e.g., application specific integrated circuit (ASIC)) to control image sensors and coordinate data collected thereby. For example, a multiplexer or field programmable gate array (FPGA) or complex programmable logic device (CPLD) is generally used to combine image signals, such as performing multiplexing of the data captured by the image processors. The inclusion of the external processor and/or other hardware to support the image sensors may additionally increase footprint of the electronics and cost more for assembly of the multi-camera system. As such, there is a desire to reduce footprint of the electronics, reduce cost, and improve overall efficiency of multi-camera systems.

BRIEF SUMMARY

To reduce cost and footprint of electronics of multi-camera systems, the principles provided herein utilize image sensors to form a data stream independent of a controller or other processing circuitry (e.g., ASIC, processor, or other digital circuitry). The image sensors may be configured to embed synchronization data (e.g., timestamp and frame identifier) and utilize embedded frame mixing features to enable the design of multi-camera system (e.g., dual camera with far and near field-of-view) at less cost and with a smaller physical footprint. In an embodiment, synchronization signals may be communicated to each of the image sensors to synchronize the image sensors when capturing images. The image sensors may further be configured to control respective illumination devices while capturing images. One or more image sensors may be configured to capture an image without an illumination device being turned ON or without having a respective illumination device so as to capture an image with ambient lighting to avoid reflection or other optical artifact.

In an alternative embodiment, a master/slave configuration of the image sensors may be utilized. There are two main reasons to give the image sensor chain master/slave capability of operation, including cost and synchronization. Synchronization between two or more image sensors conventionally uses external digital computation, which represents a system cost. If the image sensor embeds capabilities for mixing image and synchronization features, then the overall system cost is reduced as there is no need of an external mobile industry processor interface (MIPI) video switch or field programmable gate array (FPGA), for example. Synchronization provides for a more reliable stereo-camera system, which provides for more accurate laser triangulation. As a result, for example, a reduction in calculation errors for increased accuracy with depth map reconstruction, distance estimation, or other multi-camera functions is possible.

One embodiment of a multi-camera system may include a first camera including a first lens and a first image sensor, and a second camera including a second lens and a second image sensor. The first image sensor may be communicatively coupled with the second image sensor, where the first image sensor is configured to communicate image data to the second image sensor. A camera controller may be configured to cause the first and second image sensors to capture and generate respective first and second image data. The first image data may be communicated from the first image sensor to the second image sensor, and the second image sensor may be configured to output a data stream inclusive of the first image data and the second image data.

One embodiment of a method may include capturing a first image by a first image sensor of a first camera. First image data may be generated by the first image sensor. A second image may be captured by a second image sensor. Second image data may be generated by the second image sensor. The first image data may be communicated to the second image sensor, and a data stream may be output by the second image sensor, where the data stream may be inclusive of the first image data and the second image data.

BRIEF DESCRIPTION OF THE DRAWINGS

Illustrative embodiments of the present invention are described in detail below with reference to the attached drawing figures, which are incorporated by reference herein and wherein.

Figure 5A:
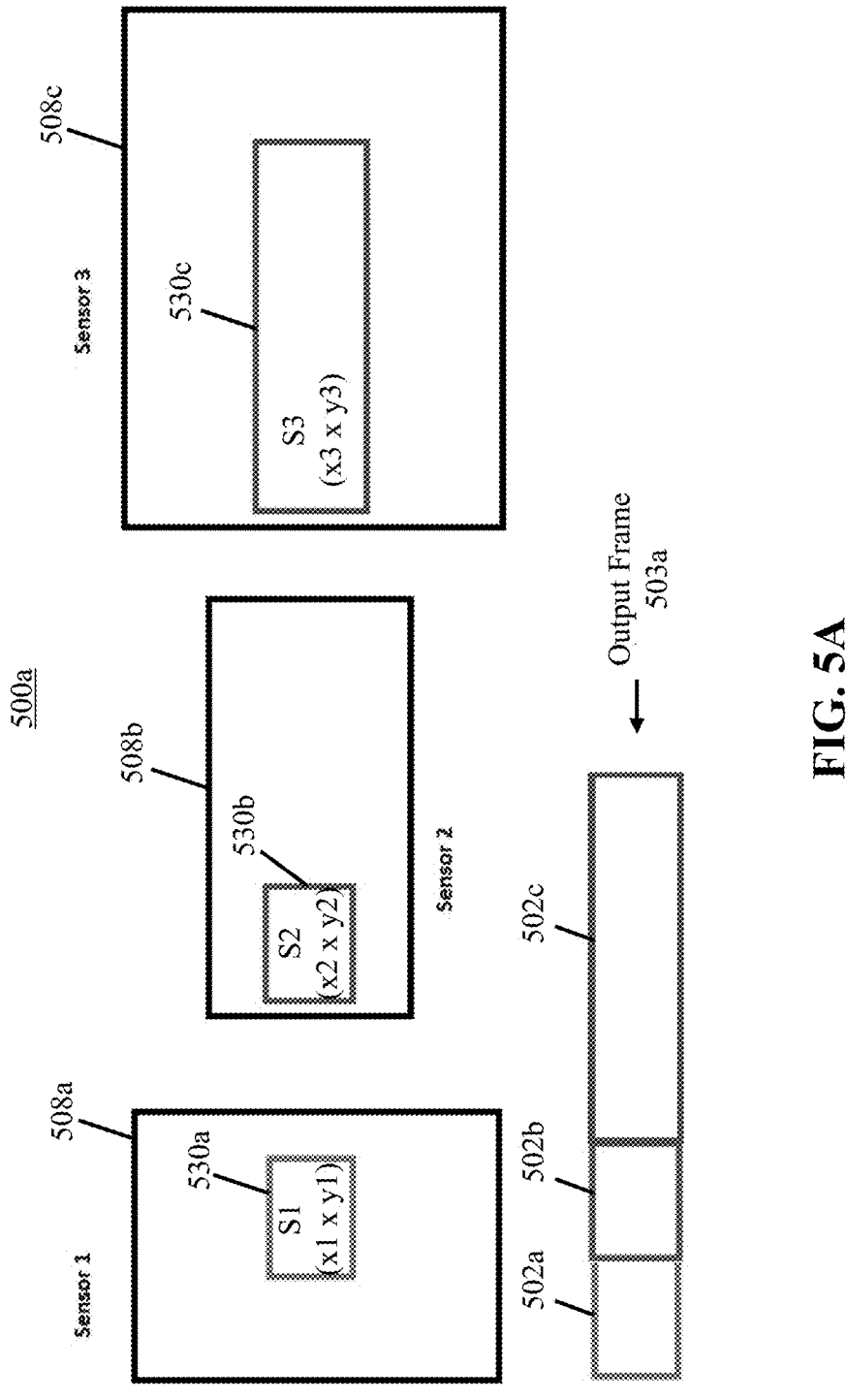
FIG. 5A is an illustration of a system including an illustrative set of sensors in which an illustrative stitching composition is performed to provide for a multi-frame MIPI output (stitching composition)
Figure 5B:
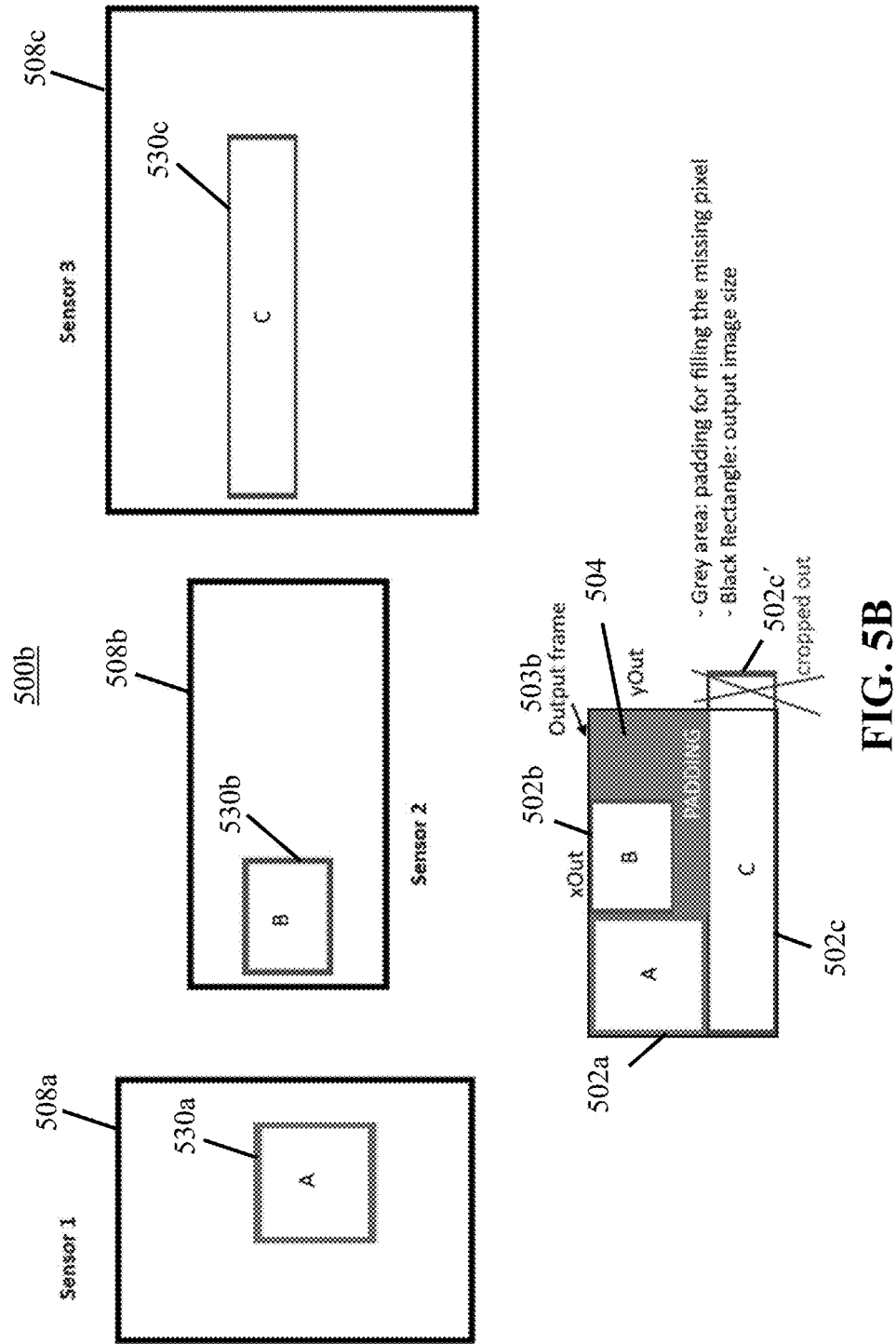
Figures 6, 7:
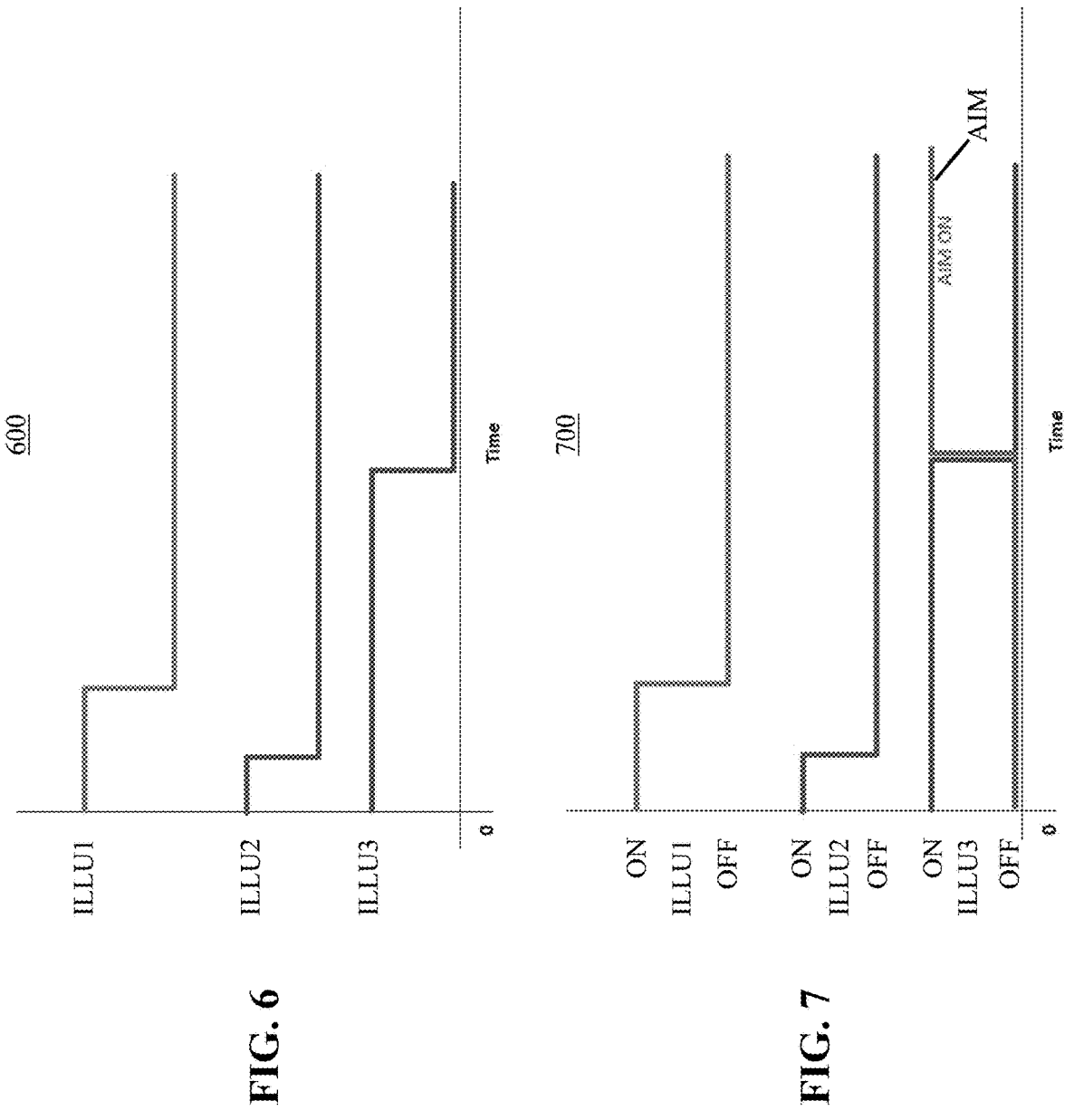

With regard to FIG. 5B, an illustration of a system including the illustrative set of image sensors from which an illustrative stitching composition in vertical and/or horizontal direction of image data is performed to provide for a multi-frame MIPI output frame (stitching composition);

FIG. 6 is a graph of illustrative sensor illumination synchronization signals; and FIG. 7 is a graph of illustrative sensor illumination synchronization signals showing also the synchronization with the aiming system by means of the signal AIM ON.

DETAILED DESCRIPTION OF THE DRAWINGS

Figure 1:
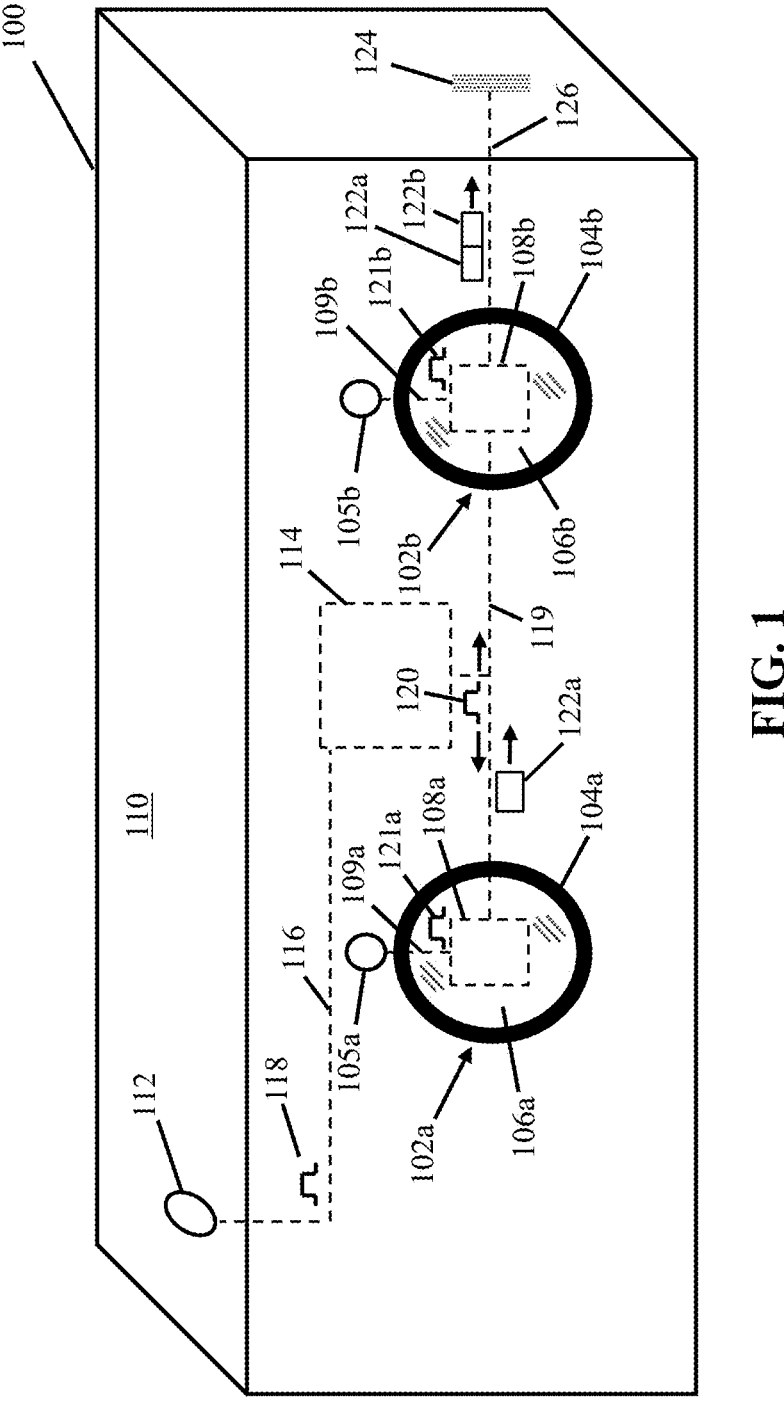
FIG. 1 is an illustration of an illustrative three-dimensional (3D) camera system inclusive of sensors synchronized in accordance with the principles described herein.

With regard to FIG. 1, an illustration of an illustrative multi-camera system 100 (e.g., three-dimensional (3D) stereoscopic camera system, multi-spectral camera, multiple fields-of-view camera, etc.) inclusive of multiple sensors 102a and 102b (collectively 102) in accordance with the principles described herein is shown. In alternative embodiments, the multi-camera system 100 may include more than two cameras and/or may not be stereoscopic even if only two cameras are utilized. In this instance, the cameras 102 may be configured as a stereoscopic camera system. In an alternative embodiment, one of the cameras 102*a* may have different optical characteristics (e.g., a longer focal length, field-of-view, resolution, etc.) than the other camera 102*b*, thereby enabling machine-readable indicia (e.g., barcodes, QR codes, etc.) to have a higher probability of being correctly read as the multi-camera system 100 with different focal lengths may be less negatively impacted by differing distances (e.g., positioned at different distances on a conveyer belt) of the machine-readable indicia from the multi-camera system 100.

The cameras 102 may include camera devices 104*a* and 104*b* (collectively 104), and illumination or light devices 105*a* and 105*b* (collectively 105). The camera devices 104 may include an optical element (e.g., lens, lens holder or camera housing, etc.) 106*a* and 106*b* (collectively 106) and image sensors 108*a* and 108*b* (collectively 108) that are in optical alignment with the optical elements 106. It should be understood that the image sensors 108 may be in direct or indirect (e.g., via a mirror or prism) optical alignment with the optical elements 106 such that light that passes through the optical elements 106 are focused on the image sensors 108. The illumination devices 105 may be conditioned by electrical signals generated by the image sensors 108 via electrical circuit 109*a* and 109*b* (collectively 109). The cameras 102 may include, but are not limited to, the camera devices 104, illumination devices 105, optical elements 106, and image sensors 108. The multi-camera system 100 may further include a housing 110 that houses and/or supports the cameras 102 and other electrical and electronic devices, as further described herein. Although shown, an aiming illumination device may be configured to generate an aiming illumination signal to assist a user with locating direction at which the camera devices 104 are pointing.

A trigger 112 may be a push-button or other physical device (e.g., proximity sensor, touch pad or touch screen, etc.) that enables a user to cause the cameras 102 to capture images of a scene at which each of the cameras 102 are directed. In an alternative embodiment, rather than using a physical trigger 112, an electronic trigger (e.g., software executed by a processor) may be configured to receive a trigger signal via a hardwire or wireless communication via an antenna (not shown) or other methods (e.g., voice commands) to cause the cameras 102 to capture images. A system controller 114 may include at least one processor configured to perform system functions for controlling camera operations, image data communications, system set-up, etc., of the multi-camera system 100. In an embodiment, the system controller 114 may be configured to enable a user to perform a system set-up via a user interface (e.g., touchscreen, physical buttons and display, mobile app, website, etc.), to set up operational parameters, such as shutter speed, timer, sensitivity of sensors (not shown), brightness of illumination devices 105, image sensor to capture images with ambient light, etc. The trigger 112 may be in electrical communication with the system controller 114 via an electrical conductor 116 such that when a user presses the trigger 112, a trigger signal 118 may be communicated via the electrical conductor 116 to the system controller to initiate the cameras 102 to capture images, which includes controlling respective illumination devices 105.

More specifically, the system controller 114 may be in electrical communication with one or more of the image sensors 108 to communicate a capture image signal 120 to image sensors 108 via the electrical conductors 119. In an embodiment, the capture image signal 120 may be communicated to a master image sensor, such as image sensor 108*b*, to generate a control signal (see FIG. 2, system clock 228 or other signal) that may be used to control a slave image sensor, such as image sensor 108*a*, generally simultaneous with the master image sensor. Alternatively, the capture image signal 120 may be communicated to both of the image sensors 108 to cause each of the image sensors 108 to simultaneously capture an image. In an embodiment, the image sensors 108 may generate signals for conditioning the illumination control signals 121*a* and 121*b* (collectively 121) to cause the illumination devices 105 to illuminate while the respective image sensors 108 are capturing images. The image sensors 108 may be configured to operate over a synchronized time period or different time periods (see, for example, FIGS. 6 and 7) as configured via the system controller 114.

The image sensors 108 may have identical configurations (e.g., same dimensions, same pixel sizes, same pixel types, resolution, etc.) or have different configurations in one or more features (e.g., different dimensions, different pixel sizes, different pixel types, different resolution, etc.). The image sensors 108 may be communicatively coupled with one another, and the images sensor 108*b* may be communicatively coupled to an electrical connector 124 via a set of electrical conductors 126. The image sensors 108 generate respective image data 122*a* and 122*b* (collectively 122) such that the image data 122 may be collected (serially or in parallel) by the image sensor 108*b* and output therefrom. It should be understood that the system controller 114 may provide a capture image signals 120, but captured image data 122 are communicated between the image sensors 108 and via the electrical connector 124 independent of the system controller 114. If more than two image sensors are included as part of the multi-camera system 100, then the capture image data from each of the image sensors may be communicated successively between image sensors to a final image sensor that outputs the captured image data from the multi-camera system 100 via the electrical connector 124 (see, for example, FIG. 2). The electrical connector 124 may be a camera serial interface (CSI) or other mobile industry processor interface (MIPI) connector suitable for MIPI CSI2-DPHY specifications or other appropriate MIPI specification (e.g., CSI1, M-PHY, C-PHY, A-PHY, etc.). Other connectors and interfaces configured to use any communications protocol may be utilized.

In operation, in response to a user pressing the trigger 112, the trigger signal 118 may be received by the system controller 114, which, in turn, may issue a capture image signal 120 that is communicated to one or more of the image sensors 108. The image sensors 108 may be configured to have the same or different image capture timing, as further described herein. As shown, the image data 122*a* may be communicated via a data bus (e.g., serial or parallel data bus) from the image sensor 108 to the image sensor 108*b*, and then image sensor 108*b* may communicate the image data 122*a* and 122*b* serially to the electrical connector 124 to be output by the multi-camera system 100, as further described herein.

Figure 2:
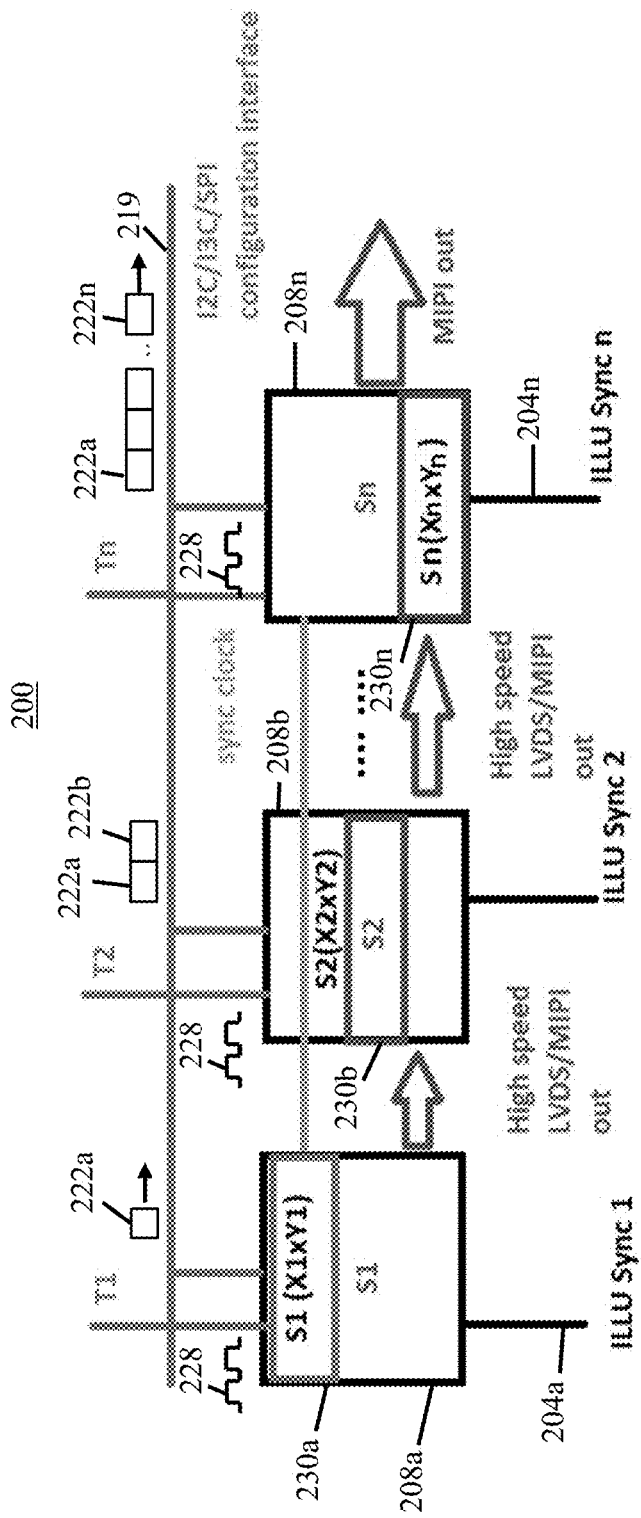
FIG. 2 is an image processing system including multiple sensors configured in a serial or chain configuration and optionally in a master/slave configuration.

With regard to FIG. 2, an image processing system 200 including multiple image sensors 202*a*-208*n* (collectively 208) that is configured serially and may optionally be configured in a master/slave configuration is shown. Multiple image sensors 208 may be serially connected using a data bus 219 used for configuring and controlling the sensors 208. The data bus 219 may be an I2C bus that is a standard bidirectional interface that uses a controller or master device, in this case an image sensor 208$n$, to communicate with slave devices, in this case image sensors 208$a$-208$n$-1. In the case of having a bidirectional interface, a different communication channel may be utilized for the host controller (that would be configured as a master) to configure the master sensor. In an alternative embodiment, if a single communication channel is used, the single communication channel may support multiple master sensors. As understood in the art, a slave device (e.g., image sensor 208$a$) may not transmit image data unless the slave device has been addressed by the master device (i.e., image sensor 208$n$). The data bus 219 may alternatively be an I3C or serial peripheral interface (SPI) data bus or communication channel. The image sensors 208, which may be synchronized by way of a common clock (e.g., CMOS/low-voltage differential signaling (LVDS)/MIPI clock), are commonly connected to a serial multipoint bus for configuration, such as data bus 219. If not synchronized with a common clock signal, each sensor may have its own independent clock. In all cases each sensor receiving image data from the previous sensor in the chain may use the receiving video bus clock to correctly synchronize with the incoming image data. The clocks may also be with different frequencies. The image sensors 208 may be provided with timing signals T1-Tn-1 to synchronize the image sensors 208 (input) and to further synchronize respective illumination devices (e.g., illumination devices 105 of FIG. 1) (out). As understood in the art, LVDS and MIPI with DPHY physical layer are high-speed, long-distance digital interface for serial communication over multiple conductor lines (e.g., differential pair) that may have signals with voltage amplitudes opposite one another from each other, where the configuration reduces noise emission by enabling the noise to be more identifiable and filterable.

In an embodiment, the image sensors 208 may be configured to work in a chain and optionally as master/slave configuration. In this example, image sensor 208$n$ may be configured as master device via I2C/I3C or SPI data bus 219 (i.e., communications channel) and may be responsible for synchronizing the chain of image sensors 208$a$-208$n$-1 by generating a system clock (e.g., LVDS system clock) 228 to control timing of the other image sensors 208$a$-208$n$-1 that are configured as slave devices. The system clock 228 may be generated by another device.

In another embodiment, rather than using a common clock source, each of the image sensors 208$b$-208$n$ may receive image data 222$a$-222$n$-1 as a MIPI data stream formed of data packets (see, for example, FIGS. 3-5) from the previous image sensors 208$a$-208$n$-1 in the chain. Each of the images sensors 208$b$-208$n$ may, in response, regenerate the MIPI data stream by merging respective image data 222$b$-222$n$ and add to the previous set(s) of image data (and any additional metadata (e.g., timestamp) so as to output an enhanced MIPI output data stream. By utilizing a chain configuration as opposed to a master/slave configuration, networking architecture of the multi-camera system is simplified and design with different MIPI data rates of image data 222 from each of the image sensors 208 may be easier.

Each of the image sensors 208 may be configured to output a certain portion of data captured by the same or different sets of pixels of the respective image sensors 208. For example, image sensor 208$a$ may output image data 222$a$ from a top portion 230$a$ (e.g., pixels X1×Y1), image sensor 208$b$ may output image data 222$b$ from a middle portion 230$b$ (e.g., pixels X2×Y2), and image sensor 208$n$ may output image data 222$n$ from a bottom portion 230$n$ (e.g., pixels Xn×Yn). It should be understood that the portions of image sensors may have alternative configurations (see, for example, FIG. 5A) and have different numbers of rows and/or columns of pixels (see, for example, FIG. 5A). The different image data 222$a$-222$n$ (collectively 222) may be formed into a MIPI output data stream that is output by the image sensor 208$n$. The idea is to create a MIPI output formed of the image data 222 that is a mix of image portions output by the image sensors 208 to be transmitted to a MIPI interface (e.g., MIPI video port) to another device (e.g., host system, such as a barcode reader) responsible for further processing of the image data 222.

Figures 3, 4:
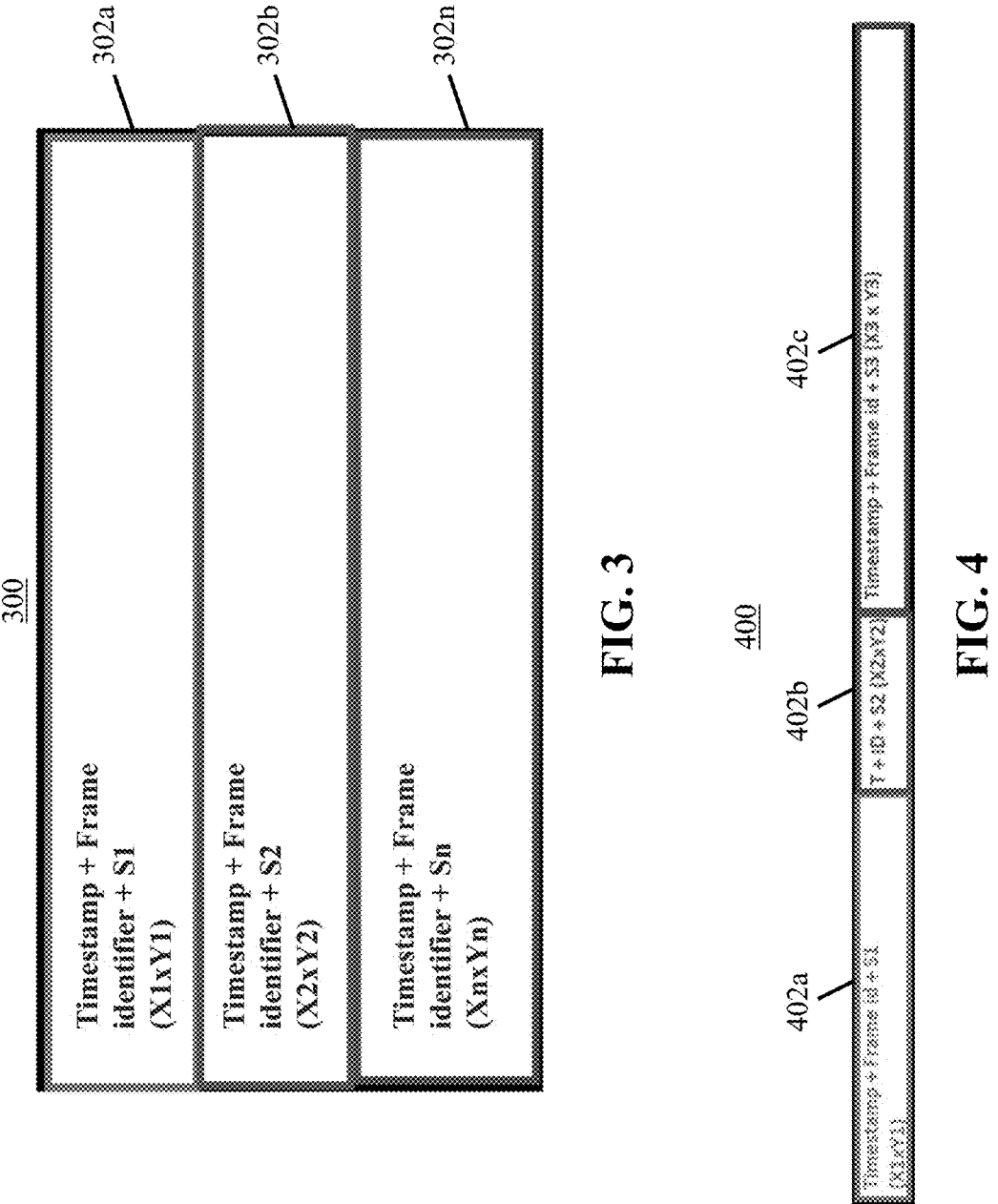
FIG. 3 is a block diagram of an illustrative multi-frame MIPI output in a vertical orientation.
FIG. 4 is an illustration of a multi-frame MIPI output (horizontal composition)

With regard to FIG. 3, a block diagram of an illustrative multi-frame MIPI output 300 inclusive of image data in a vertical orientation is shown. The multi-frame MIPI output 300 may include multiple sets of image data frames 302$a$-302$n$ (collectively 302), where each of the image data frames may include a timestamp, image frame identifier, and image data captured by respective image sensors. In an embodiment, with N image sensors, each of the image sensors may have a different sizes and/or resolution with respect to the others (e.g., image sensor 1 having size and/or resolution X1×Y1, image sensor 2 having size and/or resolution X2×Y2, image sensor n having size and/or resolution Xn×Yn). The horizontal size and/or resolution of the composed image may be defined, in this example, X1=X2=Xn. The vertical size and/or resolution instead can be any: Y1 !=Y2 !=Yn. The size and/or resolution may be considered a "chained output frame," which results in image data of X (Y1+Y2+Yn) so the total amount of image data from the image sensors can be bigger than the resolution of a single sensor.

A composed data frame, which may be a combination of the image data frames 302, may be used by the host to perform multiple operations, such as, but not limited to, decoding a machine-readable indicia, performing laser triangulation, and performing exposure and gain evaluation.

With regard to FIG. 4, an illustration of a multi-frame MIPI output 400 including a horizontal composition of image frame data 402$a$-402$c$ (collectively 402) is shown. The image frame data 402 may include timestamp, image frame identifier, and image data. In this example, three image sensors are used in a multi-camera system, and lines, such as Y1=Y2=Y3, are combined so there are the same number of rows, but X1 !=X2 !=X3 (i.e., X1 does not equal X2 which does not equal X3). By using a horizontal composition of image frame data by combining lines of image sensors, which enables a virtual enlarged field-of-view (FOV) by combining fields-of-view of the image sensors. This embodiment with a virtual enlarged FOV may be utilized in many different applications, where multiple FOVs are pertaining to different optical systems folded by mirrors that project the optical field-of-view outside an exit window of a multi-camera system, in either or both vertical and horizontal directions.

With regard to FIG. 5A, an illustration of a system 500$a$ including an illustrative set of image sensors 508$a$-508$c$ (collectively 508) from which an illustrative stitching composition of image data 502$a$-502$c$ (collectively 502) is performed to provide for a multi-frame MIPI output (stitching composition) 503$a$ is shown. The image sensors 508 may each have different physical configurations (e.g., width, length) and optionally resolution differences, as well. Although three image sensors 508 are shown, it should be understood that the principles described herein may include up to N sensors. The stitching composition may be formed using window portions of the image sensors 508. In an embodiment, a number of rows of the composed multi-frame 503*a* may be equal for windows 530*a*-530*c* (collectively 530), where Y1=Y2=Y3, but the number of columns of the windows 530 may be different, where X1 !=X2 !=X3. The horizontal resolution of the windows 530 may not be the corresponding sensor horizontal full resolution (i.e., the windows 530 are defined as portions of pixels of the total number of pixels of the image sensors in either or both the horizontal and vertical directions).

In an embodiment, the same windowing may be applied for a multi-image sensor system, where window portions from the image sensors may have the same number of columns (also inferior to the maximum horizontal resolution of each sensor), but also a different number of rows. The image data captured by the windows of the image sensors along with other data (e.g., timestamp, frame identifier, etc.) may be combined in an output frame with the rows "stacked" on each other (see FIG. 3). In an embodiment, the rows of image data output from each of the image sensors 508 may be interleaved. For example, in a multi-camera system with three image sensors A, B, and C, the following interleaved image data may be arranged:

Output image data row1 is: row1 of sensor A,
    Output image data row2 is: row1 of sensor B,
    Output image data row3 is: row1 of sensor C,
    Output image data row4 is: row2 of sensor A,
    Output image data row5 is: row2 of sensor B,
    Output image data row6 is: row2 of sensor C, etc.

It should be understood that each of the previous embodiments may create a multi-frame of image data that may have more pixel data than the largest sensor of the sensor set or have fewer pixel data than the smallest sensor of the sensors set. In an embodiment, the multi-frame of image data can also contain dummy pixels to create a virtual frame of any resolution to accommodate the host camera interface specific needs (e.g., add rows of pixel data with zero value). Moreover, each of the previous embodiments may include windows generated by each image sensor with some or all of the image sensors and/or windows having different number of columns and rows. Padding or cropping may be used to merge image data from each of the windows in an image with the desired or set number of rows and columns (see, for example, FIG. 5B).

With regard to FIG. 5B, an illustration of a system 500*b* including the illustrative set of image sensors 508*a*-508*c* (collectively 508) from which an illustrative stitching composition of image data 502*a*-502*c* (collectively 502) is performed to provide for a multi-frame MIPI output frame (stitching composition) 503*b* is shown. Windows 530*a*-530*c*, which may be the same or different sizes and locations as the windows 530*a*-530*c* of FIG. 5A, may be used for capturing the image data 502. In this embodiment, the image data 502 is shown to be positioned within the output frame 503*b*, but a padding region 504 formed of rows and columns (e.g., rows and columns of 0's) may be included in the output frame 503*b* to fill regions within which the image data 502 is not included. In the event that any of the image data 502 extends outside of the image output frame 503*b*, cropping of the image data, in this case image data 502*c'*, may be performed.

In the previous examples, the output image is considered to have a fixed number of columns and rows because of the difficulty of camera interface drivers and/or software architecture in handling different/changing resolution on the same camera interface. However, a wide range of combinations of rows and columns with different numbers of image data from the different image sensors may be possible, and in some cases useful. In an embodiment, MIPI CSI2 virtual channels may be utilized, where each image sensor may have one different virtual channel associated, then in the output MIPI image data stream, each data packet may have a proper virtual channel identification so that a host system may readily determine which image data packet comes from each image sensor. The host system may then directly and easily save each set of image data of each image sensor in memory separately and possibly also with different resolution.

A similar reasoning can be expanded also to image types. For example, one image sensor can output a RAW8 image type, another image sensor may output an RGB image type, a third image sensor may output only metadata, and a fourth image sensor may output RAW12 image type (e.g., same kind of format, such as grayscale, but with different pixel depth). Then, if the host system has trouble processing different image protocols on the same camera interface, a virtual channel for the image data may then be used.

Each image sensor set can drive a specific illumination device (see FIG. 1, light emitting diode (LED), for example). In an embodiment, each sensor may be equipped with an ILLU Sync signal output that may be used to drive an illumination device synchronous with the sensor exposure.

With regard to FIG. 6, a graph 600 of illustrative sensor illumination synchronization signals $ILLU_1$-$ILLU_3$ (collectively ILLU) is shown. Each of the sensor illumination synchronization signals ILLU include high and low signal states. The high signal state indicates a time during which the respective image sensors are actively collecting images and generating image data from respective windows or entire image sensors. The first signal $ILLU_1$ is an illumination synchronization signal output by a first image sensor (e.g., $ILLU_1$ is in a high state during exposure of the first image sensor), the second image signal $ILLU_2$ is an illumination synchronization signal output by a second image sensor (e.g., $ILLU_2$ is in a high state during exposure of the second image sensor), and the third signal $ILLU_3$ is an illumination synchronization signal output by a third image sensor (e.g., $ILLU_3$ is in a high state during exposure of the third image sensor). $ILLU_1$-$ILLU_3$ signals are used to generate the electrical signals that are driving ON/OFF the respective illumination systems 1-3. Illumination systems 1-3 can be driven in single pulse mode or with multiple pulses. By using different exposure times and, consequently different illumination times, the multi-camera system may be configured to capture images of a wide range of objects with variable distances, wavelengths, relative speeds, etc., from the camera, and have an increased probability of successfully capturing an image thereof to produce image data from one or more of the image sensors that may be used for other purposes by a host system, such as a barcode reader, optical character recognition system, or other image system that is configured as a multi-camera system. Other systems may include multi-spectrum imaging systems, standard range reading (near/far depth-of-fields, focal distance, or focal lengths), combination of color/monochrome imaging, different magnification and/or resolutions for one or more cameras than other cameras on a system, different color systems (e.g., RGB sensor and other color sensor(s)), different spatial resolution system, and other multi-camera systems.

In particular, at time 0, the exposure time of the three sensors is synchronous with the synchronized illumination signals ILLU, but duration of the synchronized illumination signals ILLU may be any duration and may be programmed to be the full integration time or a portion of the integration time (single or multiple light pulses) of respective image sensors. This programmable feature during sensor exposure may be utilized to synchronize any illuminator device. The "OFF" illumination feature may be utilized if the multi-camera device is performing a reading on a glass display or on a highly reflective surface (e.g., metal) to avoid reflection (often called mobile phone mode), for example, is activated. In an embodiment, one of the N sensors may be configured to perform mobile phone reading without use of an illumination device. One of those signals (normally the longest in duration in time) may be used to synchronize an AIM system (e.g., LED or LASER light to help a user identify location at which barcode reader is aimed), as shown in FIG. 7.

With regard to FIG. 7, a graph 700 of illustrative sensor illumination synchronization signals $ILLU_1$-$ILLU_3$ (collectively ILLU) including showing an AIM synchronization signal is shown. The AIM synchronization signal may be used to drive an AIM illumination signal or a pointer light (e.g., laser or LED illumination signal). If the multi-camera system is configured to avoid exposing the AIM illumination or pointer signal (e.g., visible laser spot, cross, etc.) such that the image sensors do not sense the AIM illumination signal, then the ON state of the AIM synchronization signal must be in the OFF state during the longest exposure time (i.e., while $ILLU_3$ is in the ON state). If the AIM illumination signal has to be present in one or more sensor images, then driving the AIM synchronization signal is to be configured accordingly (e.g., turn to an ON state in response to $ILLU_1$ transitioning to an OFF state). By turning off respective illuminators, energy is saved.

One embodiment of a multi-camera system may include a first camera including a first lens and a first image sensor, and a second camera including a second lens in a second image sensor. The first image sensor may be communicatively coupled with the second image sensor, where the first image sensor is configured to communicate image data to the second image sensor. A camera controller may be configured to cause the first and second image sensors to capture and generate respective first and second image data. The first image data may be communicated from the first image sensor to the second image sensor, and the second image sensor may be configured to output a data stream inclusive of the first image data and the second image data.

The first and second cameras may have different depths-of-field, resolution, focus distance, pixel size, or different optical characteristics in general. Alternatively, the first and second cameras may operate over different spectral regions. In an embodiment, the data stream may be communicated via a mobile industry processor interface (MIPI) specification, including CSI2 protocol on DPHY physical layer or other appropriate camera interface specifications (CSI1, MPHY, APHY, etc.). The system may further include (i) a first illuminator associated with the first camera and be configured to illuminate a first scene of which the first camera is configured to capture, and (ii) a second illuminator associated with the second camera and configured to illuminate a second scene of which the second camera is configured to capture. The first and second image sensors may be further configured to communicate respective first and second illumination synchronization signals to the respective first and second illuminators, thereby causing the respective first and second illuminators to illuminate while the first and second image sensors are capturing images to generate the respective first image data and second image data, the first illuminator and second illuminator being configured to switched ON and OFF independent of respective first and second cameras capturing images.

In an embodiment, the second image sensor is configured as a master device and the first image sensor is configured as a slave device such that the second image sensor communicates a signal to the first image sensor to cause the first image sensor to communicate the first image data to the second image sensor. The system may further include a communication bus (e.g., i2c or SPI bus or some differential communication bus) configured to communicate low voltage differential signals (LVDS) or other communications protocol depending on the data bus (e.g., if image or video is communicated on the communications bus), and to which each of the first and second image sensors are connected. The second image sensor may be configured to generate and communicate a synchronization timing signal via the communication bus to the first image sensor to cause the first and second image sensors to be synchronized with one another.

The first and second image sensors may each further be configured to generate first and second data sets inclusive of a timestamp, frame identifier, and image data. The system may further be configured with an aiming signal illuminator that outputs an aiming illumination signal to enable a user to view location of view of the first and second cameras, and where the camera controller is further configured to cause the aiming signal illuminator to be in an OFF state during a time period that the first and second image sensors are capturing images or to cause the aiming signal illuminator to be in an ON state during a time period that the first and second image sensors are capturing images.

Each of the first and second image sensors may further be configured to output respective first and second image data with corresponding rows and columns of pixel data, where the rows and columns of pixel data are different for the first image data and the second image data.

The system may further include a third camera including a third lens and a third image sensor that is communicatively coupled with the first image sensor, and wherein the camera controller may further be configured to cause the third image sensor to capture and generate third image data. The third image data may be communicated from the third image sensor to the first image sensor, and the second image sensor may further be configured to output a data stream inclusive of the first image data, second image data, and third image data.

In an embodiment, the multi-camera system may be a code reader including a trigger device with which a user engages to cause the camera controller to initiate the first and second image sensors to capture an image and generate the respective first and second image data representative of a machine-readable indicia.

One embodiment of a method may include capturing a first image by a first image sensor of a first camera. First image data may be generated by the first image sensor. A second image may be captured by a second image sensor. Second image data may be generated by the second image sensor. The first image data may be communicated to the second image sensor, and a data stream may be output by the second image sensor, where the data stream may be inclusive of the first image data and the second image data.

Capturing the first and second images may include capturing the first and second images using different optical characteristics. For example, in one embodiment, capturing the first image may include capturing the first image at a first depth-of-field, and capturing the second image may include capturing the second image at a second depth-of-field, and where the first and second depths-of-fields are different from one another. In another embodiment, field-of-view, focus position, resolution, or otherwise may be different for each of the captured first and second images.

The process may further include illuminating, by a first illuminator associated with the first camera, a first scene of which the first camera is configured to capture, and illuminating, by a second illuminator associated with the second camera, a second scene of which the second camera is configured to capture. Respective first and second illumination synchronization signals may be communicated by the first and second image sensors to the respective first and second illuminators, thereby causing the respective first and second illuminators to illuminate while the first and second image sensors are capturing images to generate the respective first image data and second image data.

The process may further include configuring the second image sensor as a master device and the first image sensor as a slave device such that the second image sensor communicates a signal to the first image sensor to cause the first image sensor to communicate the first image data to the second image sensor. A synchronization timing signal may be communicated via a communication bus by the second image sensor to the first image sensor to cause the first and second image sensors to be synchronized with one another.

Each of the first and second image sensors may generate first and second data sets inclusive of a timestamp, frame identifier, and image data. An aiming illumination signal may be caused to be in an OFF state during a time period that the first and second image sensors are capturing images. The process may further output, by each of the first and second image sensors, respective first and second image data with corresponding rows and columns of pixel data, where the rows and columns of pixel data are different for the first image data and the second image data. Moreover, the process may enable a user to engage a trigger device to cause the first and second image sensors to capture and generate the respective first and second image data.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A multi-camera system, comprising:

a first camera including a first lens and a first image sensor;

a second camera including a second lens and a second image sensor, the first image sensor being communicatively coupled with the second image sensor, the first image sensor configured to communicate image data to the second image sensor, wherein the first camera and the second camera have different optical characteristics in one or more of different depth-of-fields, different focus positions, or different resolutions;

a camera controller configured to cause the first and second image sensors to capture and generate respective first and second image data, the first image data being communicated from the first image sensor to the second image sensor, and the second image sensor configured to output a data stream inclusive of the first image data and the second image data;

a first illuminator associated with the first camera and configured to illuminate a first scene of which the first camera is configured to capture; and a second illuminator associated with the second camera and configured to illuminate a second scene of which the second camera is configured to capture, and wherein the first and second image sensors are further configured to communicate respective first and second illumination synchronization signals to the respective first and second illuminators, thereby causing the respective first and second illuminators to illuminate while the first and second image sensors are capturing images to generate the respective first image data and second image data, the first illuminator and second illuminator being configured to switched ON and OFF independent of respective first and second cameras capturing images.

2. The system according to claim 1, wherein the data stream may be communicated via a mobile industry processor interface (MIPI) protocol.

3. The system according to claim 1, wherein the second image sensor is configured as a master device and the first image sensor is configured as a slave device such that the second image sensor communicates a signal to the first image sensor to cause the first image sensor to communicate the first image data to the second image sensor.

4. The system according to claim 3, further comprising a communication bus to which each of the first and second image sensors are connected, and wherein the second image sensor is configured to generate and communicate a synchronization timing signal via the communication bus to the first image sensor to cause the first and second image sensors to be synchronized with one another.

5. The system according to claim 1, wherein the first and second image sensors are each further configured to generate first and second data sets inclusive of a timestamp, frame identifier, and image data.

6. The system according to claim 1, further comprising an aiming signal illuminator configured to output an aiming illumination signal to enable a user to view location of view of the first and second cameras, and wherein the camera controller is configured to cause the aiming signal illuminator to be in an OFF state during a time period that the first and second image sensors are capturing images or to cause the aiming signal illuminator to be in an ON state during a time period that the first and second image sensors are capturing images.

7. The system according to claim 1, wherein each of the first and second image sensors are configured to output respective first and second image data with corresponding rows and columns of pixel data, wherein the rows and columns of pixel data are different for the first image data and the second image data in at least one characteristic selected from the group consisting of different dimensions, different pixel sizes, different pixel types, different resolutions, or operate over different spectral regions.

8. The system according to claim 1, further comprising a third camera including a third lens and a third image sensor being communicatively coupled with the first image sensor, and wherein the camera controller is further configured to cause the third image sensor to capture and generate third image data, the third image data being communicated from the third image sensor to the first image sensor, and the second image sensor further being configured to output a data stream inclusive of the first image data, second image data, and third image data.

9. The system according to claim 1, wherein the multi-camera system is a code reader including a trigger device with which a user engages to cause the camera controller to initiate the first and second image sensors to capture an image and generate the respective first and second image data representative of a machine-readable indicia.

10. The system according to claim 1, wherein the data stream is organized as an output frame with the first image data and the second image data in a stacked arrangement.

11. The system according to claim 1, wherein the data stream is organized as an output frame with the first image data and the second image data in a horizontal arrangement.

12. The system according to claim 1, wherein the data stream is organized as an output frame that further includes a padding region to fill in regions in which the first image data and the second image data are not included.

13. A method, comprising:

illuminating, by a first illuminator associated with a first camera, a first scene of which the first camera is configured to capture;

capturing, by a first image sensor of the first camera, a first image;

generating, by the first image sensor, first image data;

illuminating, by a second illuminator associated with a second camera, a second scene of which the second camera is configured to capture; and capturing, by a second image sensor of the second camera, a second image;

generating, by the second image sensor, second image data;

communicating, by the first and second image sensors, respective first and second illumination synchronization signals to the respective first and second illuminators, thereby causing the respective first and second illuminators to illuminate while the first and second image sensors are capturing images to generate the respective first image data and second image data;

outputting, by each of the first and second image sensors, the respective first and second image data with corresponding rows and columns of pixel data, wherein the rows and columns of pixel data are different for the first image data and the second image data in at least one characteristic selected from the group consisting of different dimensions, different pixel sizes, different pixel types, different resolutions, or operate over different spectral regions;

communicating the first image data to the second image sensor; and outputting, by the second image sensor, a data stream inclusive of the first image data and the second image data.

14. The method according to claim 13, further comprising:

configuring the second image sensor as a master device;

configuring the first image sensor as a slave device such that the second image sensor communicates a signal to the first image sensor to cause the first image sensor to communicate the first image data to the second image sensor.

15. The method according to claim 14, further comprising communicating, via a communication bus by the second image sensor to the first image sensor, a synchronization timing signal to cause the first and second image sensors to be synchronized with one another.

16. The method according to claim 13, further comprising generating, by each of the first and second image sensors, first and second data sets inclusive of a timestamp, frame identifier, and image data.

17. The method according to claim 13, further comprising causing an aiming illumination signal to be in an OFF state during a time period that the first and second image sensors are capturing images.

18. A method comprising:

illuminating, by a first illuminator associated with a first camera, a first scene of which the first camera is configured to capture;

capturing, by a first image sensor of the first camera, a first image;

generating, by the first image sensor, first image data;

illuminating, by a second illuminator associated with a second camera, a second scene of which the second camera is configured to capture; and capturing, by a second image sensor of the second camera, a second image;

generating, by the second image sensor, second image data;

communicating, by the first and second image sensors, respective first and second illumination synchronization signals to the respective first and second illuminators, thereby causing the respective first and second illuminators to illuminate while the first and second image sensors are capturing images to generate the respective first image data and second image data;

communicating the first image data to the second image sensor; and outputting, by the second image sensor, a data stream inclusive of the first image data and the second image data.

19. The method according to claim 18, further comprising capturing, by the first image sensor, second image sensor, or a third image sensor an third image with ambient light.

* * * * *